United States Patent
Gao et al.

(10) Patent No.: US 9,645,266 B2
(45) Date of Patent: May 9, 2017

(54) TUNABLE ACOUSTIC TRANSMITTER FOR DOWNHOLE USE

(71) Applicant: HALLIBURTON ENERGY SERVICES, INC., Houston, TX (US)

(72) Inventors: Li Gao, Katy, TX (US); Vimal V. Shah, Sugarland, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 306 days.

(21) Appl. No.: 14/391,354

(22) PCT Filed: Dec. 17, 2013

(86) PCT No.: PCT/US2013/075765
§ 371 (c)(1),
(2) Date: Oct. 8, 2014

(87) PCT Pub. No.: WO2015/094185
PCT Pub. Date: Jun. 25, 2015

(65) Prior Publication Data
US 2016/0238720 A1    Aug. 18, 2016

(51) Int. Cl.
*E21B 47/16*    (2006.01)
*E21B 47/14*    (2006.01)
(Continued)

(52) U.S. Cl.
CPC .............. *G01V 1/159* (2013.01); *E21B 47/14* (2013.01); *E21B 47/16* (2013.01); *G01V 1/22* (2013.01);
(Continued)

(58) Field of Classification Search
CPC ........ E21B 47/16; E21B 47/122; E21B 47/14; G01V 11/002
(Continued)

(56) References Cited

U.S. PATENT DOCUMENTS 3,697,940 A * 10/1972 Berka ..................... E21B 47/16
367/82
4,282,588 A * 8/1981 Chanson ................. E21B 47/12
310/322
(Continued)

FOREIGN PATENT DOCUMENTS

| CN | 101882853 A | 11/2010 |
|---|---|---|
| IN | 241339 | 8/2006 |
| WO | WO 2013/017558 | 2/2013 |

OTHER PUBLICATIONS

International Search Report and Written Opinion of the International Searching Authority issued in International Application No. PCT/US2013/075765 on Sep. 2, 2013; 10 pages.
(Continued)

*Primary Examiner* — Ian J Lobo
(74) *Attorney, Agent, or Firm* — John Wustenberg; Parker Justiss, P.C.

(57) ABSTRACT

The resonant frequency of an example transducer can be adjusted by changing the effective mass of a backing mass using a tuning module. The tuning module includes a electrical source, a switch, and an electromagnetic coil connected in series as an electrical circuit. The electromagnetic coil is mechanically attached to the backing mass, and is disposed within a reservoir of a magneto-rheological fluid enclosed within a casing. When the switch is closed, the electrical source applies a voltage and current to the electromagnetic coil, and induces a localized magnetic field within the magneto-rheological fluid. In response to this localized magnetic field, the magneto-rheological fluid increases in viscosity, assumes properties comparable to a viscoelastic solid, and become affixed to the electromagnetic coil. As the electromagnetic coil is mechanically attached to the backing mass, the solidified magneto-rheological fluid
(Continued)

increases the effective mass of the backing mass. As a result, the resonant frequency of the transducer is altered.

23 Claims, 10 Drawing Sheets

(51) Int. Cl.
    *G01V 1/02*     (2006.01)
    *G01V 1/22*     (2006.01)
    *G01V 1/52*     (2006.01)
    *G01V 11/00*     (2006.01)
    *G08C 23/02*     (2006.01)
    *G01V 1/40*     (2006.01)
    *B06B 1/02*     (2006.01)

(52) U.S. Cl.
    CPC ................ *G01V 1/40* (2013.01); *G01V 1/52* (2013.01); *G01V 11/002* (2013.01); *G08C 23/02* (2013.01); *B06B 1/02* (2013.01)

(58) Field of Classification Search
    USPC .................................. 367/81, 82; 340/854.4
    See application file for complete search history.

(56) References Cited

U.S. PATENT DOCUMENTS

| | | | |
|---|---|---|---|
| 4,283,780 A * | 8/1981 | Nardi | E21B 47/12 310/322 |
| 4,302,826 A * | 11/1981 | Kent | E21B 47/12 175/40 |
| 6,137,747 A | 10/2000 | Shah et al. | |
| 6,272,916 B1 * | 8/2001 | Taniguchi | E21B 47/16 166/250.01 |
| 6,466,682 B2 | 10/2002 | An | |
| 6,595,285 B2 | 7/2003 | Dubois et al. | |
| 6,702,221 B2 | 3/2004 | Haber et al. | |
| 7,291,780 B2 | 11/2007 | Hosler | |
| 7,403,628 B2 | 7/2008 | Murray | |
| 7,628,254 B1 | 12/2009 | Henderson et al. | |
| 8,120,214 B2 | 2/2012 | Jeon | |
| 8,443,875 B2 | 5/2013 | Lee | |
| 8,471,137 B2 | 6/2013 | Adair et al. | |
| 2004/0112594 A1 | 6/2004 | Aronstam et al. | |
| 2005/0028522 A1 | 2/2005 | Fripp et al. | |
| 2005/0100465 A1 | 5/2005 | West | |
| 2011/0075520 A1 | 3/2011 | Gulgne et al. | |
| 2011/0149687 A1 | 6/2011 | Rayssiguier et al. | |
| 2011/0297394 A1 | 12/2011 | Vandelden | |
| 2012/0209541 A1 | 8/2012 | Ong et al. | |
| 2012/0302293 A1 | 11/2012 | Johnson et al. | |

OTHER PUBLICATIONS

Written Opinion on Patent Application, Norwegian Application No. 20150138, Norwegian Industrial Property Office, Apr. 24, 2015, 5 pages.

* cited by examiner

TUNABLE ACOUSTIC TRANSMITTER FOR DOWNHOLE USE

CLAIM OF PRIORITY

This application is a U.S. National Stage of International Application No. PCT/US2013/075765, filed Dec. 17, 2013.

TECHNICAL FIELD

This invention relates to acoustic transmitters, and more particularly to tunable variable frequency acoustic transmitters for use in downhole applications.

BACKGROUND

Wells are commonly used to access regions below the earth's surface and to acquire materials from these regions. For instance, wells are commonly used to locate and extract hydrocarbons from underground locations. The construction of wells typically includes drilling a wellbore and constructing a pipe structure, often called "casing," within the wellbore. Upon completion, the pipe structure provides access to the underground locations and allows for the transport of materials to the surface.

Before, during, and after construction of a well, a variety of tools are conventionally used to monitor various properties of the downhole environment. For example, underground logging systems may be used to inspect a pipe casing, the surrounding cement support structure, and/or the surrounding subterranean formations. These systems may be positioned independently within a wellbore, or may be placed on a drill string and positioned within the wellbore in conjunction with other downhole equipment.

In order to provide feedback to control systems and operators on the surface, these tools can transmit telemetry data to the surface for analysis. For instance, telemetry data can be transmitted via acoustic transmission. As such, there is a need for improved acoustic transmitters to optimize the transfer of telemetry data.

DESCRIPTION OF DRAWINGS

Like reference symbols in the various drawings indicate like elements.

DETAILED DESCRIPTION

Figure 1A:
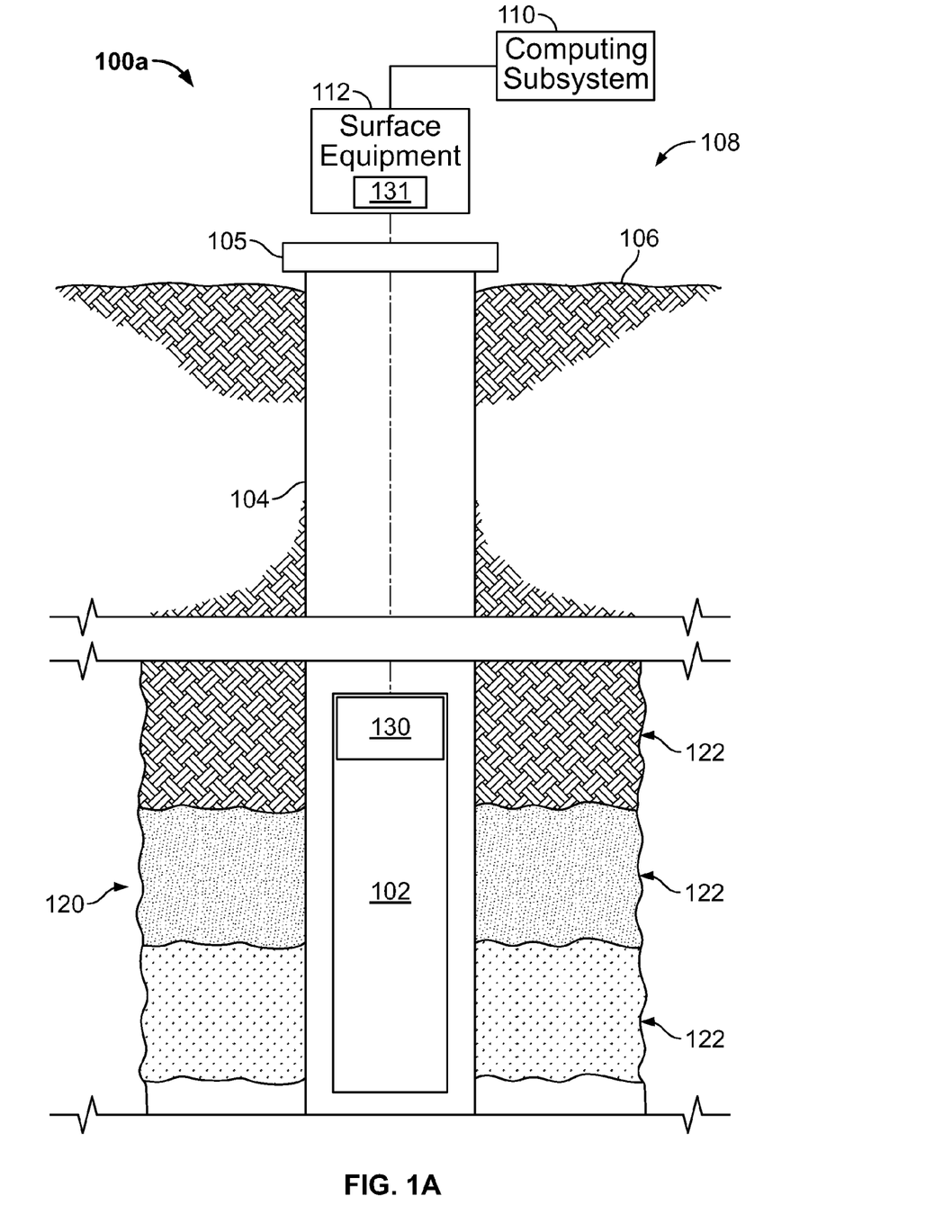
FIG. 1A is a diagram of an example well system.

FIG. 1A is a diagram of an example well system 100a. The example well system 100a includes a logging system 108 and a subterranean region 120 beneath the ground surface 106. A well system can include additional or different features that are not shown in FIG. 1A. For example, the well system 100a may include additional drilling system components, wireline logging system components, etc.

The subterranean region 120 can include all or part of one or more subterranean formations or zones. The example subterranean region 120 shown in FIG. 1A includes multiple subsurface layers 122 and a wellbore 104 penetrating through the subsurface layers 122. The subsurface layers 122 can include sedimentary layers, rock layers, sand layers, or combinations of these other types of subsurface layers. One or more of the subsurface layers can contain fluids, such as brine, oil, gas, etc. Although the example wellbore 104 shown in FIG. 1A is a vertical wellbore, the logging system 108 can be implemented in other wellbore orientations. For example, the logging system 108 may be adapted for horizontal wellbores, slant wellbores, curved wellbores, vertical wellbores, or combinations of these.

The example logging system 108 includes a logging tool 102, surface equipment 112, and a computing subsystem 110. In the example shown in FIG. 1A, the logging tool 102 is a downhole logging tool that operates while disposed in the wellbore 104. The example surface equipment 112 shown in FIG. 1A operates at or above the surface 106, for example, near the well head 105, to control the logging tool 102 and possibly other downhole equipment or other components of the well system 100. The example computing subsystem 110 can receive and analyze logging data from the logging tool 102. A logging system can include additional or different features, and the features of an logging system can be arranged and operated as represented in FIG. 1A or in another manner.

In some instances, all or part of the computing subsystem 110 can be implemented as a component of, or can be integrated with one or more components of, the surface equipment 112, the logging tool 102 or both. In some cases, the computing subsystem 110 can be implemented as one or more discrete computing system structures separate from the surface equipment 112 and the logging tool 102.

In some implementations, the computing subsystem 110 is embedded in the logging tool 102, and the computing subsystem 110 and the logging tool 102 can operate concurrently while disposed in the wellbore 104. For example, although the computing subsystem 110 is shown above the surface 106 in the example shown in FIG. 1A, all or part of the computing subsystem 110 may reside below the surface 106, for example, at or near the location of the logging tool 102.

The well system 100a can include communication or telemetry equipment that allows communication among the computing subsystem 110, the logging tool 102, and other components of the logging system 108. For example, the components of the logging system 108 can each include one or more transceivers or similar apparatus for wired or wireless data communication among the various components. For example, the logging system 108 can include systems and apparatus for wireline telemetry, wired pipe telemetry, mud pulse telemetry, acoustic telemetry, electromagnetic telemetry, or a combination of these other types of telemetry. In some cases, the logging tool 102 receives commands, status signals, or other types of information from the computing subsystem 110 or another source. In some cases, the computing subsystem 110 receives logging data, status signals, or other types of information from the logging tool 102 or another source.

Logging operations can be performed in connection with various types of downhole operations at various stages in the lifetime of a well system. Structural attributes and components of the surface equipment 112 and logging tool 102 can be adapted for various types of logging operations. For example, logging may be performed during drilling operations, during wireline logging operations, or in other contexts. As such, the surface equipment 112 and the logging tool 102 may include, or may operate in connection with drilling equipment, wireline logging equipment, or other equipment for other types of operations.

Figure 1B:
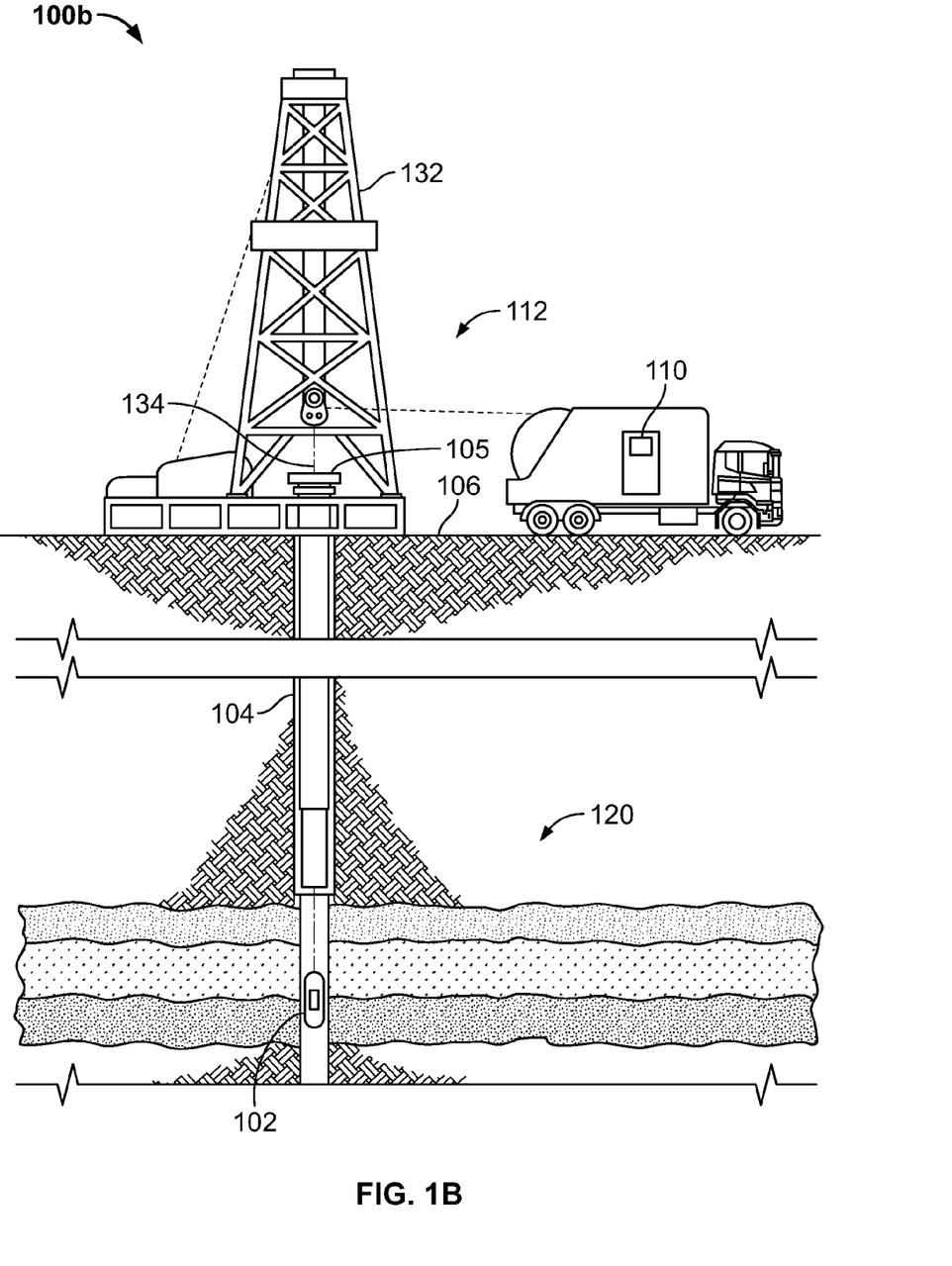
FIG. 1B is a diagram of an example well system that includes an NMR logging tool in a wireline logging environment.

In some examples, logging operations are performed during wireline logging operations. FIG. 1B shows an example well system 100b that includes the logging tool 102 in a wireline logging environment. In some example wireline logging operations, a the surface equipment 112 includes a platform above the surface 106 is equipped with a derrick 132 that supports a wireline cable 134 that extends into the wellbore 104. Wireline logging operations can be performed, for example, after a drilling string is removed from the wellbore 104, to allow the wireline logging tool 102 to be lowered by wireline or logging cable into the wellbore 104.

Figure 1C:
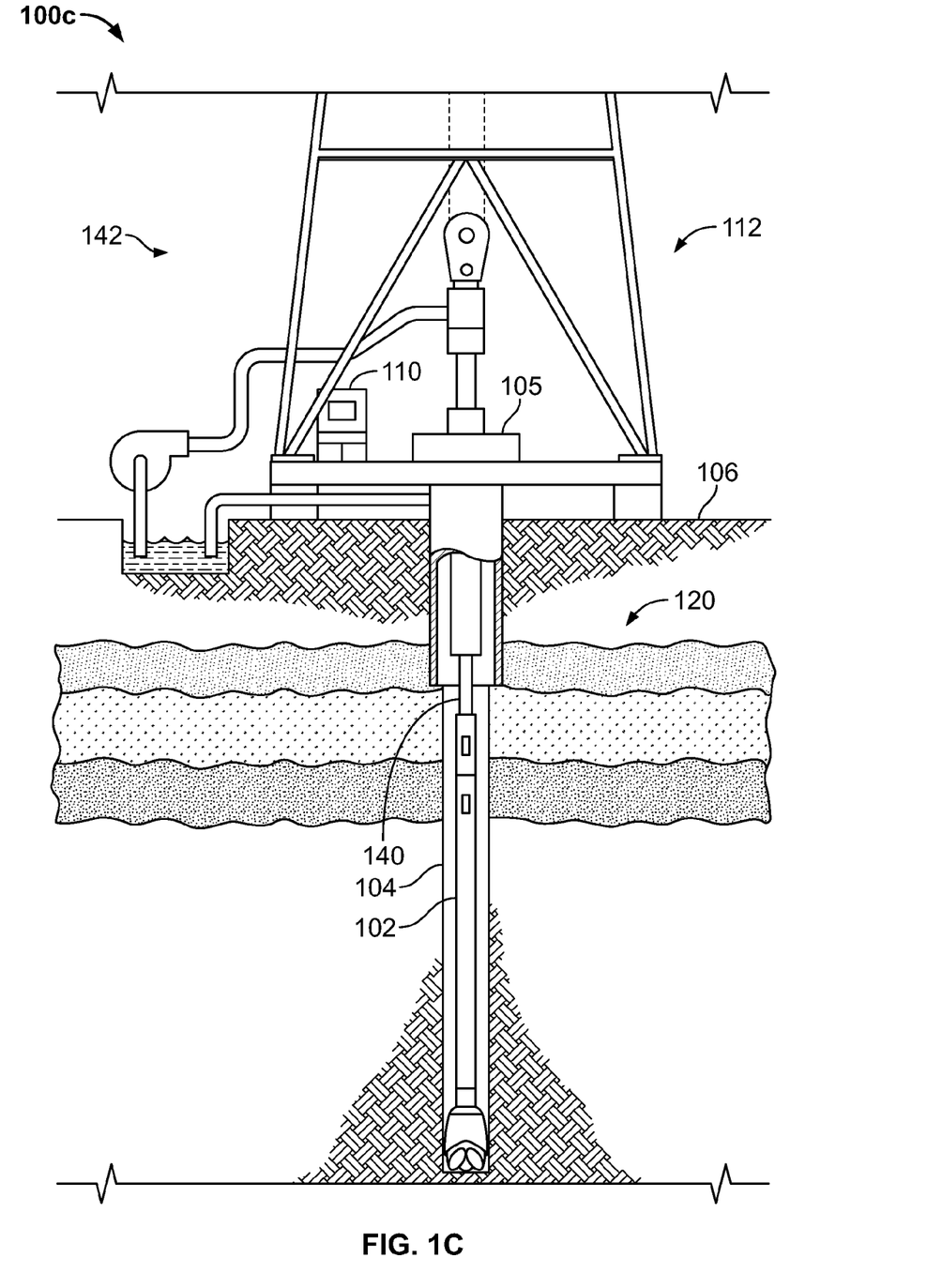
FIG. 1C is a diagram of an example well system that includes an NMR logging tool in a logging while drilling (LWD) environment.

In some examples, logging operations are performed during drilling operations. FIG. 1C shows an example well system 100c that includes the logging tool 102 in a logging while drilling (LWD) environment. Drilling is commonly carried out using a string of drill pipes connected together to form a drill string 140 that is lowered through a rotary table into the wellbore 104. In some cases, a drilling rig 142 at the surface 106 supports the drill string 140, as the drill string 140 is operated to drill the wellbore 104 to penetrate the subterranean region 120. The drill string 140 may include, for example, a kelly, drill pipe, a bottom hole assembly, and other components. The bottom hole assembly on the drill string may include drill collars, drill bits, the logging tool 102, and other components. The logging tools may include measuring while drilling (MWD) tools, LWD tools, and others.

As shown, for example, in FIG. 1B, the logging tool 102 can be suspended in the wellbore 104 by a coiled tubing, wireline cable, or another structure that connects the tool to a surface control unit or other components of the surface equipment 112. In some example implementations, the logging tool 102 is lowered to the bottom of a region of interest and subsequently pulled upward (e.g., at a substantially constant speed) through the region of interest. As shown, for example, in FIG. 1C, the logging tool 102 can be deployed in the wellbore 104 on jointed drill pipe, hard wired drill pipe, or other deployment hardware. In some example implementations, the logging tool 102 collects data during drilling operations as it moves downward through the region of interest during drilling operations. In some example implementations, the logging tool 102 collects data while the drilling string 140 is moving, for example, while it is being tripped in or tripped out of the wellbore 104.

In some example implementations, the logging tool 102 collects data at discrete logging points in the wellbore 104. For example, the logging tool 102 can move upward or downward incrementally to each logging point at a series of depths in the wellbore 104. At each logging point, instruments in the logging tool 102 perform measurements on the subterranean region 120. The measurement data can be communicated to the computing subsystem 110 for storage, processing, and analysis. Such data may be gathered and analyzed during drilling operations (e.g., during logging while drilling (LWD) operations), during wireline logging operations, or during other types of activities.

The computing subsystem 110 can receive and analyze the measurement data from the logging tool 102 to detect properties of various subsurface layers 122. For example, the computing subsystem 110 can identify the density, material content, or other properties of the subsurface layers 122 based on the measurements acquired by the logging tool 102 in the wellbore 104.

In some implementations, for example as shown in FIG. 1A, the well system 100a includes an acoustic transmitter module 130 that transmits telemetry data to an acoustic receiver 131, in order to provide wireless communication capability between logging tool 102 and surface equipment 112. In some implementations, acoustic transmitter module 130 can be mechanically coupled to a component of the well system that extend between the logging tool 102 and the surface equipment 131, for example a drill string 140 (see FIG. 1C). To transmit telemetry data, the acoustic transmitter module 130 induces time-dependent acoustic energy (e.g., in the form of stress waves or acoustic pulses) onto the drill string 140. These waves or pulses contain information regarding the telemetry data, and propagate through the drill string up to the surface where they are detected by an acoustic receiver 131. These telemetry signals are interpreted by the surface equipment 112 and computing subsystem 110.

Acoustic transmitter module 130 can include electromagnetic transducer that converts electromagnetic energy into translational motion. For instance, in some implementations, the acoustic transmitter module 130 includes a transducer that is capable of providing acoustic energy in a desired frequency range (e.g., 50-500 kHz) and at a sufficiently high amplitude, under the conditions typically encountered in downhole environments (e.g., at high temperatures, such as temperatures in excess of 170° C., and at high pressures, such as pressures greater than 20,000 PSI). For example, acoustic transmitter module 130 can include a piezoelectric transducer, an electromagnetic acoustic transducer (EMAT), a magnetostrictive transducer, or another type of transducer.

Figure 2:
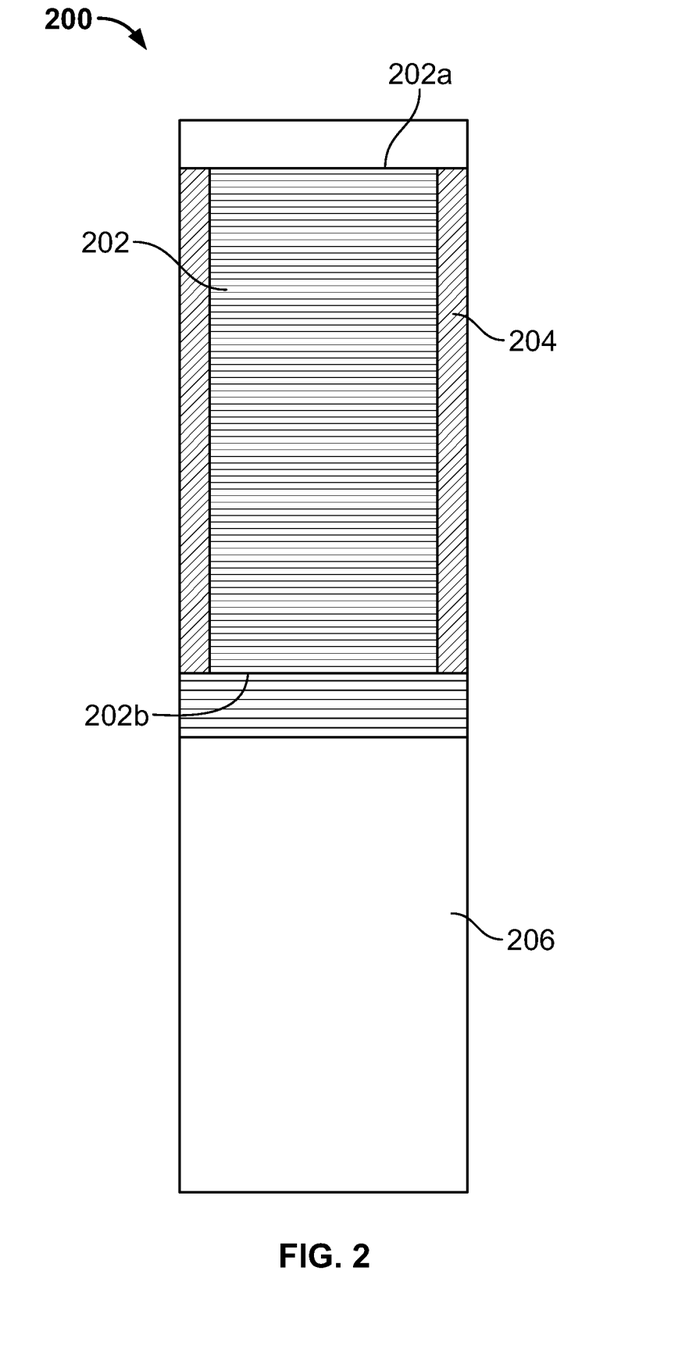
FIG. 2 is a diagram of an example piezoelectric transducer.

In some implementations, acoustic transmitter module 130 includes a piezoelectric transducer 200. A schematic representation of an example piezoelectric transducer 200 is shown in FIG. 2. Transducer 200 includes a piezoelectric stack 202 extending axially from a first end 202a and a second end 202b. Piezoelectric stack 202 is disposed within a support sleeve 204, which encases the radial periphery of piezoelectric stack 202 and mechanically couples the transducer 200 to the drill string 140. Piezoelectric stack 202 is clamped axially within support sleeve 204 between a top nut 206, which is mechanically fixed to the proximal end 202a, and a backing mass 206, which is mechanically fixed to the distal end 202b. In this configuration, piezoelectric stack 202 is axially compressed between top nut 206 and backing mass 206.

During operation of transducer 200, an electric input signal (e.g., an electrical signal with a time-dependent voltage differential) is applied to the piezoelectric stack 202. In response to the applied signal, the piezoelectric stack 202 reacts by expanding or contracting in the axial directions. Because the piezoelectric stack 202 is axially compressed against backing mass 206, the expansion of the piezoelectric stack 202 is transferred as a compressive stress to the support sleeve 204 via the top nut 206. Thus, in response to an applied time-dependent excitation signal, the transducer 200 "fires," and induces a time-dependent acoustic signal that is directed through the support sleeve 204 and into the drill string 140. As the piezoelectric stack 202 contracts and expands according to the applied input signal, the frequency of the induced acoustic signal can be adjusted by adjusting the frequency of the input signal. Thus, in some implementations, transducer 200 can be used to induce a range of frequencies by varying the frequency of the input signal.

Figure 3:
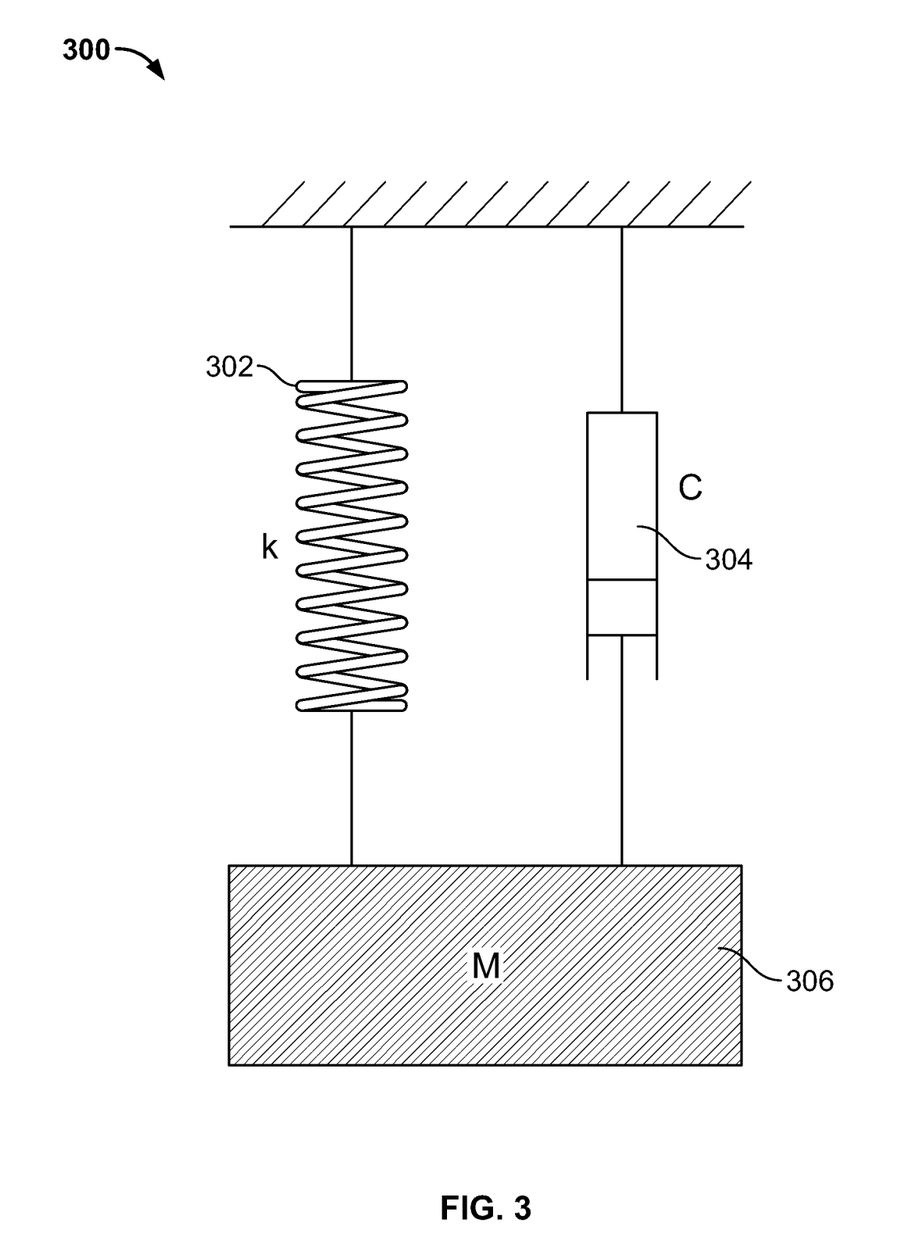
FIG. 3 is a diagram of an example physical model for a transducer.

Backing mass 206 acts as an inertial element against which the piezoelectric stack 202 can react or "push." The mass of the backing mass 206 can have a predicable effect on the resonance behavior of the transducer 200. For example, in some implementations, the relationship between the mass of the backing mass 206 and the resonant frequency of the transducer 200 can be represented using a physical model 300. Referring to FIG. 3, the model 300 includes a spring 302 with spring constant k, a damper 304 with a damping coefficient C, and a mass 306 with a mass M, arranged in an ideal mass-spring-damper system. When represented by model 300, the transducer 200 resonates at a frequency f, where:

$$f = \frac{1}{2\pi} \sqrt{\frac{k}{M}},$$

and where M is the mass of the backing mass 206, and k and C are dependent on the physical properties of the piezoelectric stack 202 and the support sleeve 204. Thus, by changing the mass, M, of the backing mass 206, the resonant frequency of the transducer 200 can be tuned. In some implementations, the resonant frequency of the transducer 200 can be tuned to coincide with the frequency of the induced acoustic signal in order to increase the output efficiency of the transducer 200 and/or to increase the amount of acoustic energy that is directed into the drill string 140.

Figure 4:
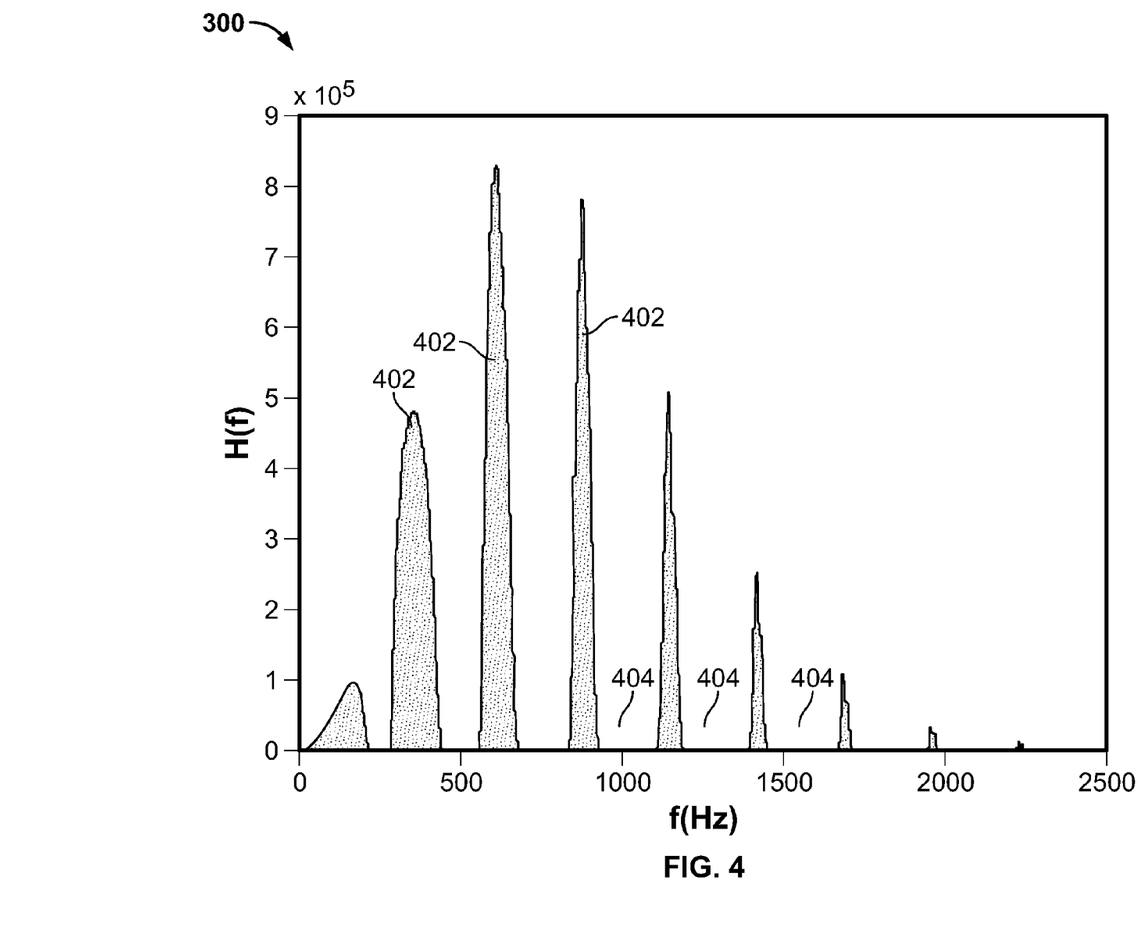
FIG. 4 is a plot of an example channel transfer function for a drill string.

In some implementations, the drill string 140 does not perfectly transmit acoustic energy along its length, and may attenuate the acoustic signals produced by the acoustic transmitter module 130 as the signals travel its length. This attenuation behavior may be frequency dependent. For example, acoustic energy of certain frequency ranges (i.e., "pass bands") can propagate along the length of the drill string 140, while acoustic energy of other frequency ranges (i.e., "stop bands") are attenuated by the drill string 140 and cannot fully propagate along its length. Pass bands and stop bands can be visualized in the frequency domain by a channel transfer function. Referring to FIG. 4, plot 400 shows a range of input frequencies f, and a channel transfer function H(f) (i.e., a function describing the ratio between the input and output signals of the system in the frequency domain) for an example drill string. Pass bands are represented as a series of peaks 402 in the frequency domain, while stop bands are represented as a series of gaps 404. As shown in plot 400, when an acoustic transmitter module 102 transmits acoustic signals within the pass bands, it will have higher output efficiency than if it transmitted acoustic signals outside of the pass bands. Likewise, when the resonant frequency of acoustic transmitter module 120 coincides with both the pass band and the frequency of the induced acoustic signal, the output efficiency of the acoustic transmitter module 102 can be further enhanced.

The shape of a channel transfer function can vary based on several factors, including the physical composition of the drill string (e.g., the material of the drill string and its components), the physical dimensions and arrangement of the drill string and its components, the physical properties of the surrounding environment (e.g., the composition of the surrounding environment, the ambient temperature, and so forth), and other factors. Accordingly, the number, height, location, and width of a drill string's pass bands and stop bands can differ depending on the specific implementation or application. For instance, in some implementations, there can be one or more pass bands (e.g., one, two, three, four, five, and so forth). In some implementations, the height of each pass band can differ. For example, in some implementations, the height of a pass band can be between approximately 1 to $1\times10^3$, $1\times10^3$ to $1\times10^6$, and so forth. In some implementations, the pass bands can regularly or irregularly spaced from each other in the frequency domain. As an example, a channel transfer function can have several regularly spaced pass bands with centers around about 225 Hz, 450 Hz, 675 Hz, 900 Hz, and so forth. In some implementations, the width of each pass band can vary. For instance, in some implementations, each pass band can have a width of about 10-20 Hz, 20-30 Hz, 40-50 Hz, 60-70 Hz, and so forth.

In addition, the transfer function and its pass bands can also change due to dynamically changing conditions as the drill string is passed through a subterranean formation. As an example, the center of a pass band can shift in approximately 1-10 Hz, 10-20 Hz, 20 to 100 Hz, and so forth. In another example, the number of pass bands can increase or decrease. In another example, the height of a pass band can increase or decrease (e.g., increase or decrease by 10%, 20%, 30%, 40%, and so forth). These changes to the transfer function can occur gradually, or in discretely, depending on the nature of the changing conditions.

Accordingly, in order to increase the efficiency of the acoustic transmitter module 130, the input signal can be adjusted such that the transducer induces an acoustic signal within a pass band of the drill string. Likewise, the transducer 200 can be tuned such that its resonant frequency is also within the pass band, and continues to be within the pass band even as the pass band shifts under dynamic conditions.

In order to tune the resonant frequency of the transducer 200, the mass of the backing mass 206 can be adjusted until the resonant frequency of the transducer 200 coincides with a pass band of the drill string. For example, in some implementations, backing mass 206 can be replaced with a backing mass of differing mass in order to alter the resonant behavior of the transducer 200. However, in some implementations, replacing the backing mass 206 can be difficult to accomplish dynamically. For instance, in some implementations, in order to adjust the resonant behavior of the transducer 200, the logging tool 102 must be withdrawn from the wellbore 104, disassembled, reassembled using a new backing mass, and reintroduced into the wellbore 104. Though feasible, in some circumstances, such a procedure may be impractical or uneconomical.

Figure 5:
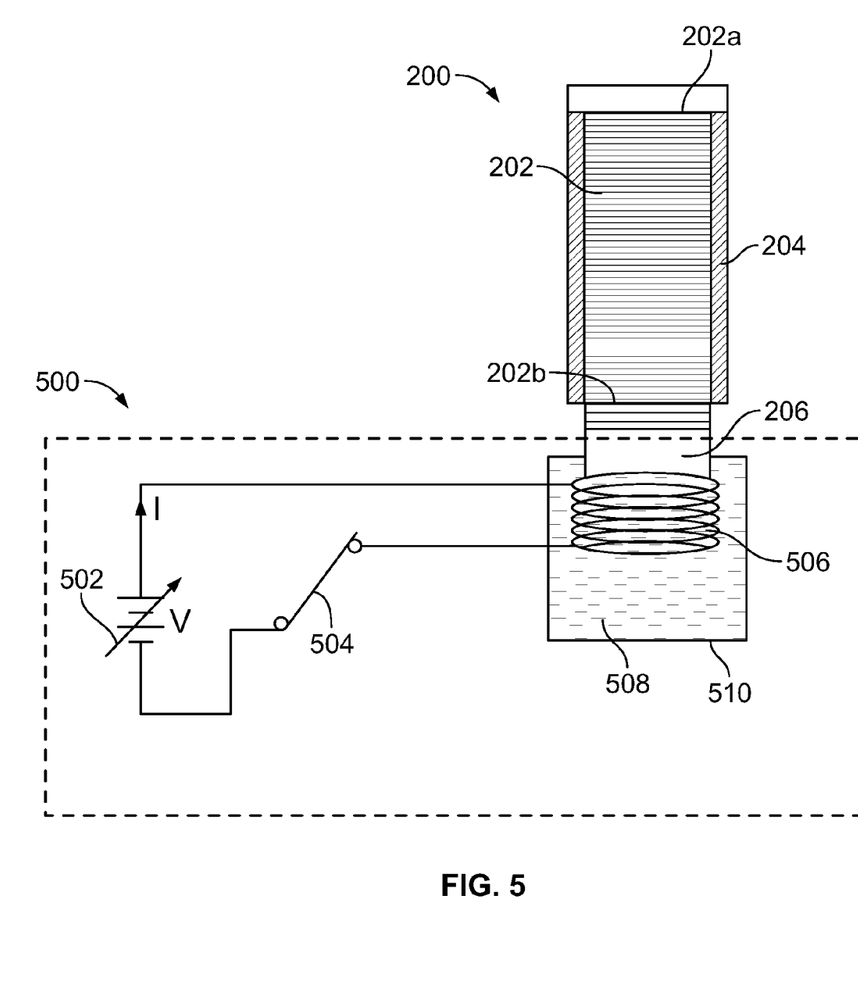
FIG. 5 is a diagram of a piezoelectric transducer and an example tuning module.

Referring to FIG. 5, in some implementations, the resonant frequency of the transducer 200 can be adjusted by changing the effective mass of the backing mass 206 using a tuning module 500. Tuning module 500 includes an electrical source 502, a switch 504, and an electromagnetic coil 506 connected in series as an electrical circuit. Electromagnetic coil 506 is mechanically attached to the backing mass 206, and is disposed within a reservoir of a magnetorheological fluid 508 enclosed within a casing 510.

Figure 6A:
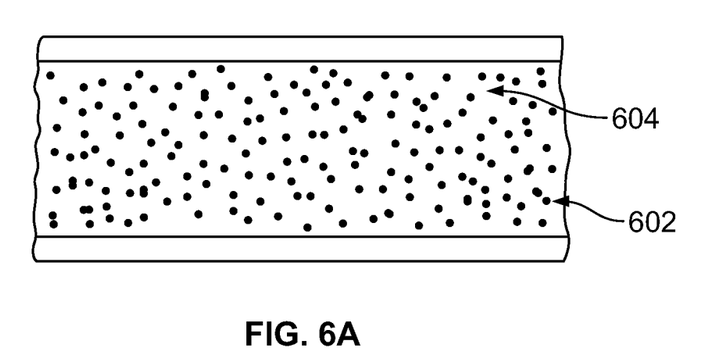
FIG. 6A is a diagram of a magneto-rheological fluid in the absence of an applied magnetic field.
Figure 6B:
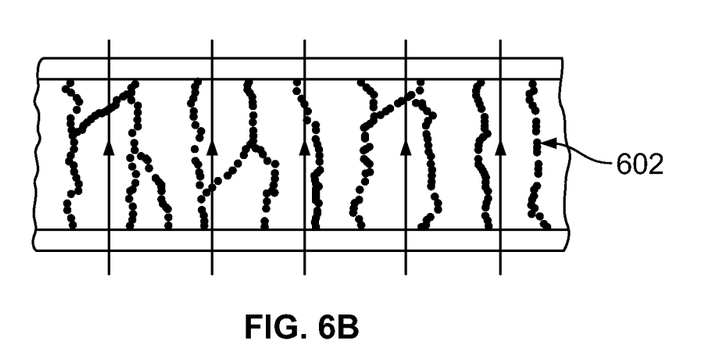
FIG. 6B is a diagram of a magneto-rheological fluid in the presence of an applied magnetic field.

Magneto-rheological (MR) fluids are a type of "smart" fluid whose mechanical properties can be altered in a controlled fashion by an external magnetic field. Referring to FIGS. 6A-B, MR fluids can be made of ferrous particles 602 suspended in a lower density carrier fluid 604. Referring to FIG. 6A, in the absence of a magnetic field, an MR fluid has a low viscosity, and exhibits continuous deformation properties typical of a fluidic material. Referring to FIG. 6B, when subject to a magnetic field, the ferrous particles 602 form chains in the direction of the magnetic flux, and causes the MR fluid to increase in apparent viscosity. When its magnetic flux density is sufficiently high, the MR fluid is said to be in an activated (i.e., "on") state, and assumes properties comparable to a viscoelastic solid, up until a point of yield (i.e., the shear stress above which shearing occurs). This yield stress is dependent on the magnetic field applied to the fluid, up to a point of magnetic saturation, after which increases in magnetic flux density have no further effect. Thus, an MR fluid can be varied between liquid and viscoelastic quasi-solid states using an applied external magnetic field.

Examples of MR fluid particles include iron-based micrometer or nanometer-scale spheres or ellipsoids. Examples of carrier fluid include water and various types of oil, such as hydrocarbon oils and silicon oils, with surfactant added to alleviate settling of magnetic particles. For example, iron-based MR fluids at 40-50% volume fraction can have yield stress of about 100 kPa (see, e.g., U.S. Pat. Nos. 5,277,282 and 5,284,330).

Referring back to FIG. 5, when switch 504 is closed, electrical source 502 applies a voltage V and current I to the electromagnetic coil 506, and induces a localized magnetic field within the magneto-rheological fluid 508. In response to this localized magnetic field, the magneto-rheological fluid 508 increases in viscosity, assumes properties comparable to a viscoelastic solid, and become affixed to the electromagnetic coil 506. As electromagnetic coil 506 is mechanically attached to the backing mass 206, the solidified magneto-rheological fluid 508 increases the effective mass of the backing mass 206 (i.e., the mass coupled to the piezoelectric stack 204). As a result, the resonant frequency of the transducer 200 is altered.

When the switch 502 is opened, the electrical source 502 no longer applies the voltage V and current I to the electromagnetic coil 506, and a localized magnetic field is removed from the magneto-rheological fluid 508. As a result, the magneto-rheological fluid 508 decreases in viscosity, loses its viscoelastic solid-like properties, and is released from the electromagnetic coil 506. As the electromagnetic coil 506 is now free to shift independently of the magneto-rheological fluid 508, the effective mass of the backing mass 206 is reduced. As a result, the resonant frequency of the transducer 200 is returned to its original state.

Therefore, in some implementations, by energizing the electromagnetic coil, the effective mass of the backing mass 206 is increased, and the resonant frequency of the transducer 200 is decreased. Conversely, by removing the applied voltage and current from the electromagnetic coil, the elective mass of the backing mass 206 is decreased, and the resonant frequency of the transducer 200 is increased. Accordingly, in some implementations, the resonant frequency of the transducer 200 can be altered between two different frequencies by applying or removing the voltage V and current I from the electromagnetic coil 506.

The magnetic field response of the magneto-rheological fluid 508 can be continuous, rather than binary. That is, as the applied current is increased continuously, the magnetic field induced in the magneto-rheological fluid is also increased continuously, and the viscosity of the magneto-rheological fluid 508 can also continuously increase until the fluid solidifies. In some implementations, electrical source 502 is adjustable, and can be used to adjust the viscosity of the magneto-rheological fluid 508 either continuously or discretely. In an example, electrical source 502 can apply varying currents that causes the magneto-rheological fluid 508 to increase in viscosity to varying degrees, but not fully solidify. This increase in viscosity can increase the friction between the electromagnetic coil 506 and the magneto-rheological fluid 508, and can impede the motion of the electromagnetic coil 506 and piezoelectric stack 202. This friction can have effects similar to increasing the effective mass of the backing mass 206, and can be used to influence the resonant frequency of the transducer 200. Thus, in some implementations, by increasing the current applied to the electromagnetic coil, the friction between the electromagnetic coil 506 and the magneto-rheological fluid 508 is increased, and the resonant frequency of the transducer 200 is decreased. Conversely, by decreasing the applied current to the electromagnetic coil, the friction between the electromagnetic coil 506 and the magneto-rheological fluid 508 is decreased, and the resonant frequency of the transducer 200 is increased. Accordingly, in some implementations, the resonant frequency of the transducer 200 can be altered between two or more discrete frequencies by adjusting the applied current between two or more currents. In some implementations, the resonant frequency of the transducer 200 can be altered in a continuous manner within a range of frequencies by adjusting the applied current continuously within a range of currents.

Figure 7:
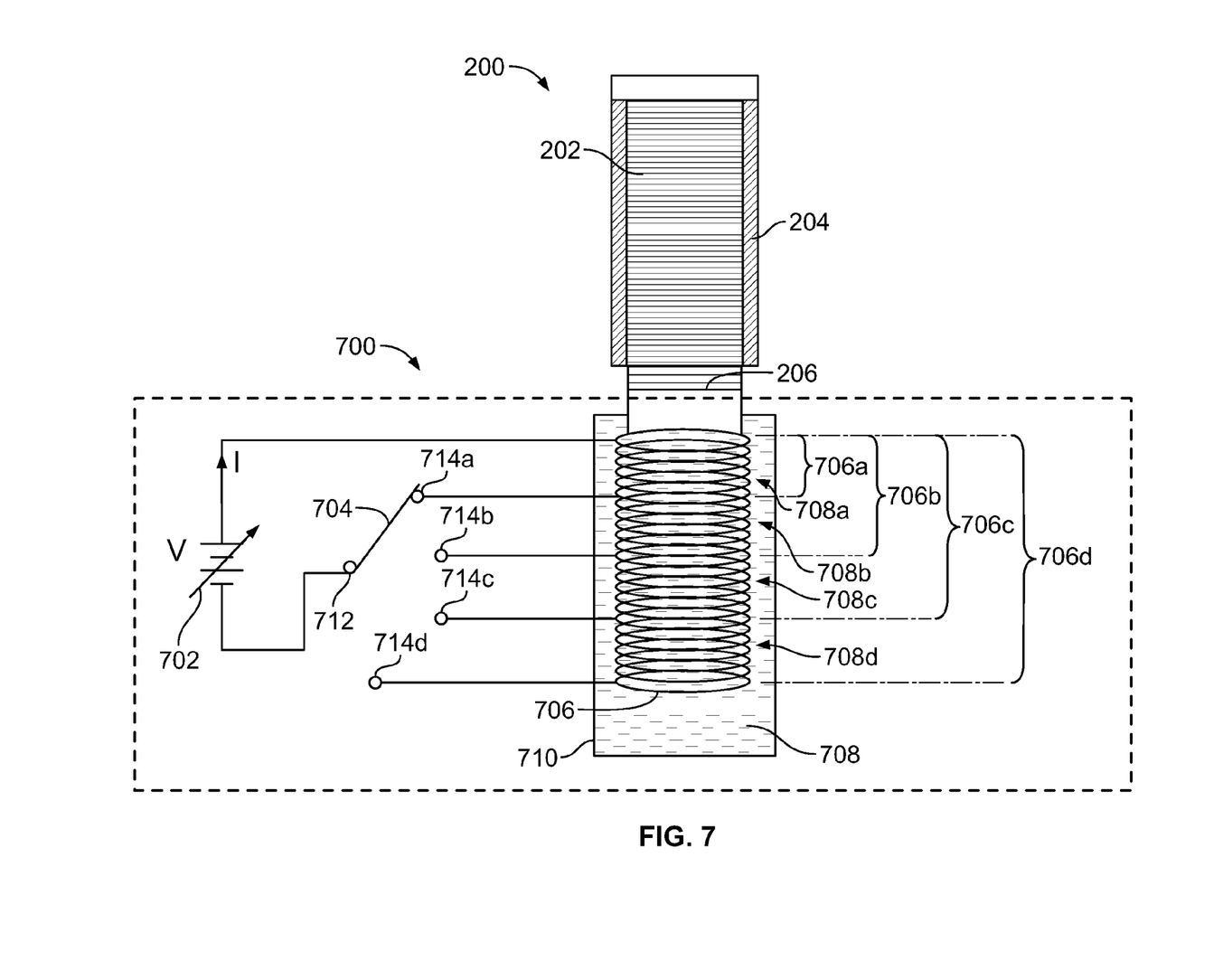
FIG. 7 is a diagram of a piezoelectric transducer and another example tuning module.

In some implementations, a tuning module can selectively apply a current to one of multiple portions of an electromagnetic coil in order to selectively increase or decrease the effective mass of the backing mass. Referring to FIG. 7, in some implementations, the resonant frequency of the transducer 200 can be adjusted by changing the effective mass of the backing mass 206 using a tuning module 700. Tuning module 700 includes a electrical source 702, a switch 704, and an electromagnetic coil 706 connected in series as an electrical circuit. Electromagnetic coil 706 is mechanically attached to the backing mass 206, and is disposed within a reservoir of a magneto-rheological fluid 708 enclosed within a casing 710.

Switch 704 can be toggled between several different states in order to complete an electrical circuit with selectable portions of electromagnetic coil 706. For instance, when switch 704 connects circuit points 712 and 714a, electrical source 702 applies a voltage V and current I to portion 706a of electromagnetic coil 706, and induces a localized magnetic field within a portion of magneto-rheological fluid 708a (i.e., the portion of magneto-rheological fluid 708 within portion 706a). In response to this localized magnetic field, portion of magneto-rheological fluid 708a increases in viscosity, assumes properties comparable to a viscoelastic solid, and become affixed to the electromagnetic coil 706. As electromagnetic coil 706 is mechanically attached to the backing mass 206, the solidified magneto-rheological fluid 708 increases the effective mass of the backing mass 206 (i.e., the mass coupled to the piezoelectric stack 204). As a result, the resonant frequency of the transducer 200 is altered.

Likewise, when switch 704 connects circuit points 712 and 714b, electrical source 702 applies a voltage V and current I to portion 706b of electromagnetic coil 706, and induces a localized magnetic field within a larger portion of magneto-rheological fluid 708*b* (i.e., the portion of magneto-rheological fluid 508 within portion 706*b*). This increase in size of the energized portion of the electromagnetic coil 706 increases the effective mass of backing mass 206, and results in a decrease in the resonant frequency of actuator 200.

In a similar manner, when switch 704 connects circuit points 712 and 714*c*, electrical source 502 applies a voltage V and current I to an even larger portion 706*c* of electromagnetic coil 706, and induces a localized magnetic field within an even larger portion of magneto-rheological fluid 708*c* (i.e., the portion of magneto-rheological fluid 508 within portion 706*c*). This increase in size of the energized portion of the electromagnetic coil 706 further increases the effective mass of backing mass 206, and results in a further decrease in the resonant frequency of actuator 200.

And when switch 704 connects circuit points 712 and 714*d*, electrical source 502 applies a voltage V and current I to the largest portion 706*d* of electromagnetic coil 706, and induces a localized magnetic field within the largest portion of magneto-rheological fluid 708*d* (i.e., the portion of magneto-rheological fluid 508 within portion 706*d*). This increase in size of the energized portion of the electromagnetic coil 706 even further increases the effective mass of backing mass 206, and results in a further decrease in the resonant frequency of actuator 200.

In this manner, switch 704 can be used to apply a voltage and current to a selectable portion of the electromagnetic coil 708, to selectively change the effective mass of backing mass 206, and to alter the resonant frequency of the transducer 200.

While FIG. 7 shows a tuning module 700 that can select from among four portions 708*a-d* of electromagnetic coil 708, in some implementations, a tuning module can select from among a lesser number of portions (e.g., two or three) or from among a great number of portions (e.g., five, six, seven, and so forth). In some implementations, electromagnetic coil 708 is not divided into discrete portions, and voltage and current can be applied to a continuously variable portion of electromagnetic coil 708.

In some implementations, for example as shown in FIG. 7, the portions 708*a-d* overlap. In some implementations, the portions 708*a-d* overlap spatially, either partially or completely, or are spatially independent from each other.

In some implementations, the electrical source 702 is also adjustable, and can apply varying currents in order to adjust the viscosity of portions of magneto-rheological fluid 708*a-d*, either continuously or discretely.

Figure 8:
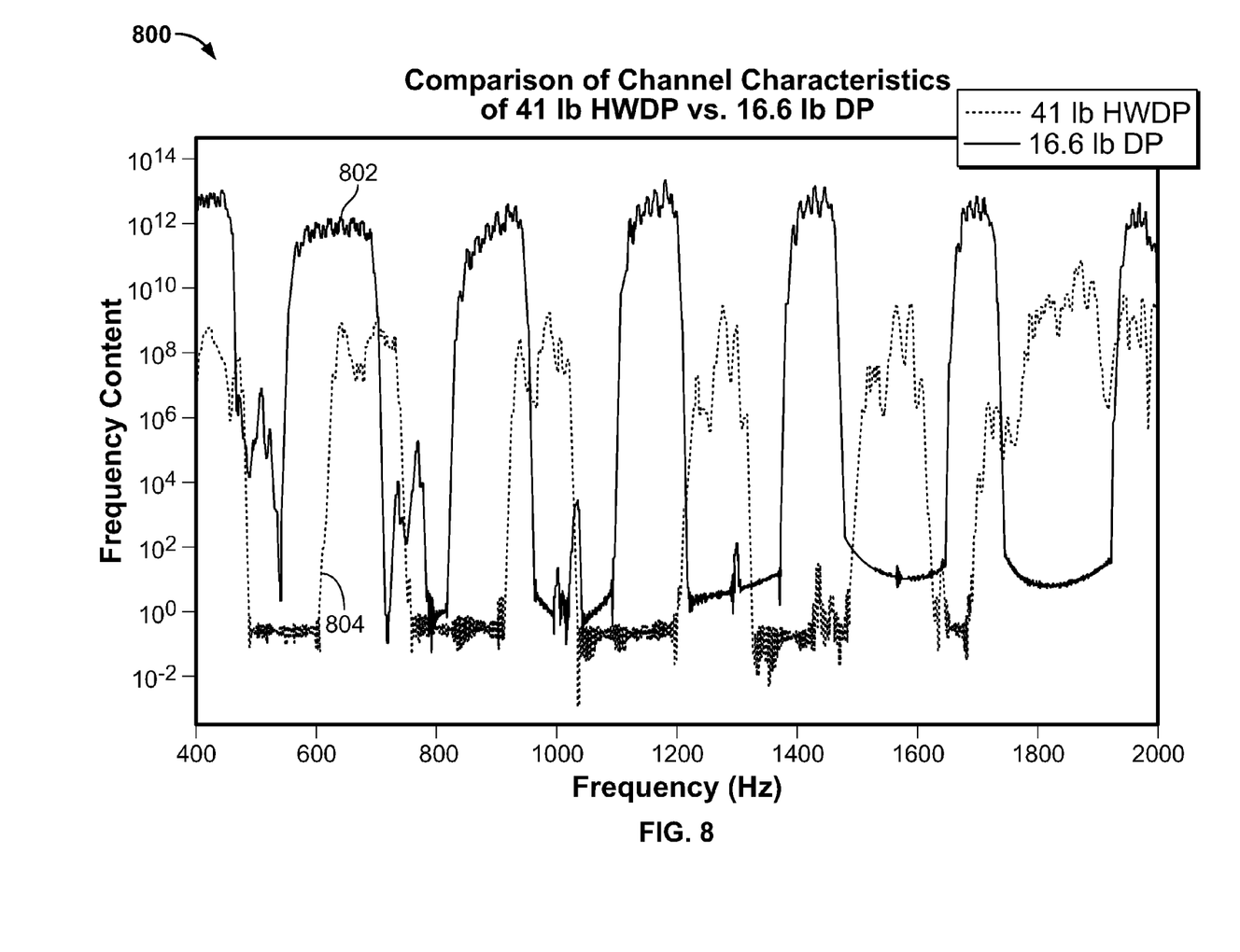
FIG. 8 is a plot of example channel transfer functions for a drill string.

In some implementations, different portions of the drill string may have different channel transfer characteristics. That is, a first length of the drill string may have a first channel transfer function, and one or more other lengths of the drill string may have one or more other channel transfer functions. Due to these varying channel transfer characteristics, in some implementations, acoustic energy may have difficulty propagating along the entire length of the drill string. For example, FIG. 8 shows a plot 800 of an example drill string having two lengths, each length represented by a different channel transfer function. The channel transfer function of the first length (line 802) and the channel transfer function of the second length (line 804) are not identical, and each has pass bands and stop bands that do not fully align. Thus, acoustic signals that have a frequency within the pass band of one length might not be within the pass band of the other length. In some implementations, acoustic module 200 can be positioned between the different lengths of the drill string, and can be used as a "repeater" in order to propagate the acoustic signal. For instance, in an example implementation, an acoustic module 200 can include an acoustic receiver that detects acoustic signals propagating in a first length of a drill string, a signal processing module that converts the signal into a signal having a frequency within a pass band of the adjacent length of the drill string, and a transducer 200 that induces the converted acoustic signal into the second length. In some implementations, the drill string may have more than two different lengths, and more than one transducer can be used as repeaters to propagate the signal along each length of the drill string.

Various aspects of the invention may be summarized as follows.

In general, in an aspect, an acoustic transmitter for generating an acoustic signal includes an actuator module and a tuning module coupled to the actuator module. The tuning module includes an electromagnetic coil, a variable electrical source, and a magnetic-rheological fluid, where the variable electrical source is in electrical communication with the electromagnetic coil and the electromagnetic coil is at least partially disposed in a magneto-rheological fluid. The acoustic transmitter is arranged so that during operation, the actuator module converts an electrical signal into vibration to generate an acoustic signal, and the variable electrical source applies a current to the electromagnetic coil such that a resonant frequency of the actuator module varies depending on the applied current.

Implementations of this aspect may include one or more of the following features:

The acoustic transmitter can be arranged so that during operation, the variable electrical source applies a current across a section of the electromagnetic coil of variable size.

The frequency of the acoustic signal can vary depending on a size of the section of the electromagnetic coil and/or a strength of a magnetic field induced by the applied current.

The acoustic transmitter can be arranged so that during operation, the section of the electromagnetic coil is selectable from among two or more portions. The two or more portions can at least partially overlap.

The acoustic transmitter can be arranged so that during operation, the tuning module varies a viscosity of the magneto-rheological fluid by varying the current applied to the electromagnetic coil.

The acoustic transmitter can be arranged so that during operation, the transmitter varies an effective mass of the tuning module by varying the current applied to the electromagnetic coil.

The resonant frequency of the actuator module can vary inversely with respect to the current applied to the electromagnetic coil.

A size of a section of the electromagnetic coil to which the current is applied can be variable and the frequency of the acoustic signal can vary inversely with respect to the size of the section.

The actuator module can include a piezoelectric stack. The piezoelectric stack can be enclosed in a sleeve.

The actuator module can include a magnetostrictive material.

A downhole logging tool can include a logging module for inclusion in a drill string. The logging module can include an acoustic transmitter as described above, an acoustic receiver, and a control module. The logging module can be arranged so that during use, the control module controls the resonant frequency of the actuator module by adjusting the applied current, and the acoustic receiver detects the acoustic signal.

The resonant frequency can be selected from a range of frequencies that overlaps a pass-band of the drill string.

In general, in another aspect, a method of adjusting a resonant frequency of an acoustic transmitter includes applying an electrical signal to an actuator of the acoustic transmitter to generate an acoustic signal, and selecting a resonant frequency of the acoustic transmitter by applying a current across an electromagnetic coil of the acoustic transmitter, the electromagnetic coil being at least partially disposed within a magneto-rheological fluid.

Implementations of this aspect may include one or more of the following features:

The method can include adjusting the resonant frequency of the acoustic transmitter by adjusting the applied current.

The current can be applied across a section of the electromagnetic coil, and the m method can include adjusting the resonant frequency of the acoustic transmitter by adjusting a size of the section of the electromagnetic coil.

The method can include adjusting the resonant frequency of the acoustic transmitter by selecting the section from among two or more portions of the electromagnetic coil.

The resonant frequency of the acoustic transmitter can vary inversely with respect to the size of the section of the electromagnetic coil. The resonant frequency of the acoustic transmitter can vary inversely with respect to the applied current.

In general, in another aspect, a method of communicating between two components of a well can include applying an electrical signal to an actuator of the acoustic transmitter to generate an acoustic signal, and controlling a resonant frequency of the acoustic transmitter by applying a current across an electromagnetic coil of the acoustic transmitter, the electromagnetic coil being at least partially disposed within a magneto-rheological fluid, directing the acoustic signal into a structure of the well, and obtaining a communications signal by detecting an acoustic signal propagating along the structure.

The method can include adjusting a resonant frequency of the acoustic signal to correspond to a pass-band of a drill string.

A number of implementations have been described. Nevertheless, it will be understood that various modifications may be made without departing from the spirit and scope of the invention.

For example, while a variety of magneto-rheological fluid-based tuning modules have been described in the context of transducers used to transfer telemetry data in a drill string, tuning modules can also be used with transducers that are used to transfer telemetry data in other media. For instance, in some implementations, magneto-rheological fluid-based tuning modules can be used to tune the resonant frequency of transducers used to transmit data in coiled tube acoustic telemetry channels or frac string acoustic telemetry channels (e.g, strings used during hydraulic fracturing operations).

In some implementations, tuning modules can also be used with transducers that are used for functions other than acoustic telemetry. For example, in some implementations, magneto-rheological fluid-based tuning modules can be used to tune the resonant frequency of transducers used in ultrasonic logging tools (e.g., ultrasonic logging tools used in wireline, slickline, LWD, and MWD applications), geophones, speakers, hydrophones, sonar transponders, and other such devices.

In addition, magneto-rheological fluid-based tuning modules can be used to tune the resonant frequency of various types of transducers, and is not limited to piezoelectric transducers. For example, magneto-rheological fluid-based tuning modules can be used in conjunction with electromagnetic acoustic transducers, magnetostrictive transducers, or other types of transducer that can be tuned by adjusting the effective mass of one or more of its components. As an example, in some implementations, a transducer can contain a magnetostrictive material (e.g., terfenol-D), where a changing magnetic field induces mechanical strain on the magnetostrictive material and causes translational motion. A magneto-rheological fluid can be used with this transducer in order to change the effective mass of one or more of its moving components in order to tune the resonant frequency of the transducer.

Accordingly, other embodiments are within the scope of the following claims.

What is claimed is:

1. An acoustic transmitter for generating an acoustic signal, comprising:
   an actuator module; and
   a tuning module coupled to the actuator module, the tuning module comprising an electromagnetic coil, a variable electrical source, and a magnetic-rheological fluid, wherein the variable electrical source is in electrical communication with the electromagnetic coil and the electromagnetic coil is at least partially disposed in a magneto-rheological fluid;
   wherein the acoustic transmitter is arranged so that during operation, the actuator module converts an electrical signal into vibration to generate an acoustic signal, and the variable electrical source applies a current to the electromagnetic coil such that a resonant frequency of the actuator module varies depending on the applied current.

2. The acoustic transmitter of claim 1, wherein the acoustic transmitter is arranged so that during operation, the variable electrical source applies a current across a section of the electromagnetic coil of variable size.

3. The acoustic transmitter of claim 2, wherein the frequency of the acoustic signal varies depending on a size of the section of the electromagnetic coil and/or a strength of a magnetic field induced by the applied current.

4. The acoustic transmitter of claim 2, wherein the acoustic transmitter is arranged so that during operation, the section of the electromagnetic coil is selectable from among two or more portions.

5. The acoustic transmitter of claim 4, wherein the two or more portions at least partially overlap.

6. The acoustic transmitter of claim 1, wherein the acoustic transmitter is arranged so that during operation, the tuning module varies a viscosity of the magneto-rheological fluid by varying the current applied to the electromagnetic coil.

7. The acoustic transmitter of claim 1, wherein the acoustic transmitter is arranged so that during operation, the transmitter varies an effective mass of the tuning module by varying the current applied to the electromagnetic coil.

8. The acoustic transmitter of claim 1, wherein the resonant frequency of the actuator module varies inversely with respect to the current applied to the electromagnetic coil.

9. The acoustic transmitter of claim 1, wherein a size of a section of the electromagnetic coil to which the current is applied is variable and the frequency of the acoustic signal varies inversely with respect to the size of the section.

10. The acoustic transmitter of claim 1, wherein the actuator module comprises a piezoelectric stack.

11. The acoustic transmitter of claim 10, wherein the piezoelectric stack is enclosed in a sleeve.

12. The acoustic transmitter of claim 1, wherein the actuator module comprises a magnetostrictive material.

13. A downhole logging tool comprising:
a logging module for inclusion in a drill string, the logging module comprising:
an acoustic transmitter, the acoustic transmitter including;
an actuator module; and
a tuning module coupled to the actuator module, the tuning module comprising an electromagnetic coil, a variable electrical source, and a magnetic-rheological fluid, wherein the variable electrical source is in electrical communication with the electromagnetic coil and the electromagnetic coil is at least partially disposed in a magneto-rheological fluid;
wherein the acoustic transmitter is arranged so that during operation, the actuator module converts an electrical signal into vibration to generate an acoustic signal, and the variable electrical source applies a current to the electromagnetic coil such that a resonant frequency of the actuator module varies depending on the applied current;
an acoustic receiver; and
a control module;
wherein the logging module is arranged so that during use, the control module controls the resonant frequency of the actuator module by adjusting the applied current, and the acoustic receiver detects the acoustic signal.

14. The downhole logging tool of claim 13, wherein the resonant frequency is selected from a range of frequencies that overlaps a pass-band of the drill string.

15. A method of adjusting a resonant frequency of an acoustic transmitter, the method comprising:
applying an electrical signal to an actuator of the acoustic transmitter to generate an acoustic signal; and
selecting a resonant frequency of the acoustic transmitter by applying a current across an electromagnetic coil of the acoustic transmitter, the electromagnetic coil being at least partially disposed within a magneto-rheological fluid.

16. The method of claim 15, further comprising adjusting the resonant frequency of the acoustic transmitter by adjusting the applied current.

17. The method of claim 15, wherein the current is applied across a section of the electromagnetic coil, and wherein the method further comprises adjusting the resonant frequency of the acoustic transmitter by adjusting a size of the section of the electromagnetic coil.

18. The method of claim 17, further comprising adjusting the resonant frequency of the acoustic transmitter by selecting the section from among two or more portions of the electromagnetic coil.

19. The method of claim 17, wherein the resonant frequency of the acoustic transmitter varies inversely with respect to the size of the section of the electromagnetic coil.

20. The method of claim 15, wherein the resonant frequency of the acoustic transmitter varies inversely with respect to the applied current.

21. A method of communicating between two components of a well, the method comprising:
applying an electrical signal to an actuator of an acoustic transmitter to generate an acoustic signal;
controlling a resonant frequency of the acoustic transmitter by applying a current across an electromagnetic coil of the acoustic transmitter, the electromagnetic coil being at least partially disposed within a magneto-rheological fluid;
directing the acoustic signal into a structure of the well; and
obtaining a communications signal by detecting an acoustic signal propagating along the structure.

22. The method of claim 21, further comprising adjusting a resonant frequency of the acoustic signal to correspond to a pass-band of a drill string.

23. The acoustic transmitter of claim 10, wherein the piezoelectric stack is axially compressed between a top nut and a backing mass.

* * * * *